(12) United States Patent
Ogunsina et al.

(10) Patent No.: US 11,941,997 B2
(45) Date of Patent: Mar. 26, 2024

(54) TOOTHBRUSH COACHING SYSTEM

(71) Applicant: PLAYBRUSH LIMITED, London (GB)

(72) Inventors: Tolulope Ogunsina, London (GB); Wiktor Grajkowski, London (GB); Matthaus Ittner, London (GB); Paul Varga, London (GB); Patrick Diem, London (GB)

(73) Assignee: PLAYBRUSH LIMITED, London (GB)

( * ) Notice: Subject to any disclaimer, the term of this patent is extended or adjusted under 35 U.S.C. 154(b) by 530 days.

(21) Appl. No.: 16/633,646

(22) PCT Filed: Aug. 10, 2018

(86) PCT No.: PCT/GB2018/052288
§ 371 (c)(1),
(2) Date: Jan. 24, 2020

(87) PCT Pub. No.: WO2019/034854
PCT Pub. Date: Feb. 21, 2019

(65) Prior Publication Data
US 2020/0211414 A1   Jul. 2, 2020

(30) Foreign Application Priority Data
Aug. 14, 2017  (GB) ..................... 1713034

(51) Int. Cl.
*A46B 9/04* (2006.01)
*A46B 15/00* (2006.01)
*G09B 19/00* (2006.01)

(52) U.S. Cl.
CPC ............ *G09B 19/0084* (2013.01); *A46B 9/04* (2013.01); *A46B 15/0002* (2013.01);
(Continued)

(58) Field of Classification Search
None
See application file for complete search history.

(56) References Cited

U.S. PATENT DOCUMENTS 8,863,343 B2 * 10/2014 Iwahori ............... A61C 17/221
15/22.1
2007/0074359 A1 * 4/2007 O'Lynn .............. A46B 15/0002
15/105
(Continued)

FOREIGN PATENT DOCUMENTS

| GB | 2541416 A | 2/2017 |
|---|---|---|
| WO | 2009141489 A1 | 11/2009 |
| WO | 2012020165 A1 | 2/2012 |

OTHER PUBLICATIONS

Great Britain Patent Application No. GB1713034.5, Great Britain Search Report dated Feb. 15, 2018.
(Continued)

*Primary Examiner* — Shay Karls
*Assistant Examiner* — Dana Lee Poon
(74) *Attorney, Agent, or Firm* — Cooper Legal Group, LLC

(57) ABSTRACT

A device for providing an indication of brushing activity of a toothbrush comprises an accelerometer configured to produce acceleration data from motion of the toothbrush, and components for filtering the acceleration data to produce gravitational components and filtering the acceleration data to produce linear acceleration components. The device further comprises a component for projecting the gravitational components and the linear acceleration components into an n-dimensional space, where and for performing a clustering process on the projections of gravitational components and linear acceleration components into n-dimensional space to produce clustering results. The clustering results comprise a plurality of clusters each of which represents a brushing
(Continued)

area. A brushing area can be determined based on an assignment of subsequent gravitational components and linear acceleration components of acceleration data to a particular cluster, and feedback provided to a user based on the determination of brushing area, thereby providing indication of brushing activity.

20 Claims, 8 Drawing Sheets

(52) U.S. Cl.
CPC ...... *A46B 15/0006* (2013.01); *A46B 15/0008* (2013.01); *A46B 15/004* (2013.01); *A46B 15/0046* (2013.01); *G09B 19/0076* (2013.01); *A46B 2200/1066* (2013.01)

(56) References Cited

U.S. PATENT DOCUMENTS

| | | | | |
|---|---|---|---|---|
| 2008/0028553 | A1* | 2/2008 | Batthauer | A46B 15/0006 15/105 |
| 2010/0323337 | A1* | 12/2010 | Ikkink | A46B 15/004 434/263 |
| 2013/0074616 | A1* | 3/2013 | Puurunen | A46B 15/0046 73/865.8 |
| 2013/0203008 | A1* | 8/2013 | Kressman | A61B 5/0071 433/27 |
| 2014/0065588 | A1* | 3/2014 | Jacobson | A61C 17/225 15/22.1 |
| 2015/0230898 | A1* | 8/2015 | Miller | A61C 17/221 15/22.1 |
| 2016/0143718 | A1* | 5/2016 | Serval | A46B 15/0038 15/22.1 |
| 2016/0343270 | A1 | 11/2016 | Zheng et al. | |
| 2018/0160796 | A1* | 6/2018 | Jeanne | A61C 17/221 |
| 2019/0045916 | A1* | 2/2019 | Jeanne | A46B 15/0038 |
| 2021/0289271 | A1* | 9/2021 | Huang | A46B 17/00 |
| 2023/0132413 | A1* | 5/2023 | Gatzemeyer | A46B 15/0004 15/105 |

OTHER PUBLICATIONS

International Patent Application No. PCT/GB2018/052288, International Search Report and Written Opinion, dated Nov. 15, 2018.

* cited by examiner

| BRUSHING ACTIVITY | LED FEEDBACK | REQUIRED USER ACTION |
|---|---|---|
| USER BRUSHES ONE AREA >30s | GREEN LIGHT, BLINKING | CHANGE BRUSHING AREA |
| USER BRUSHES TOO FAST | RED LIGHT, BLINKING | SLOW DOWN |
| USER HAS BRUSHED FOR ≥ 2 MIN | RED LIGHT, SOLID | STOP BRUSHING |
FIG.9
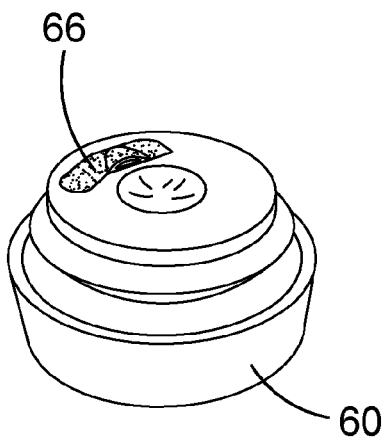
FIG.10a
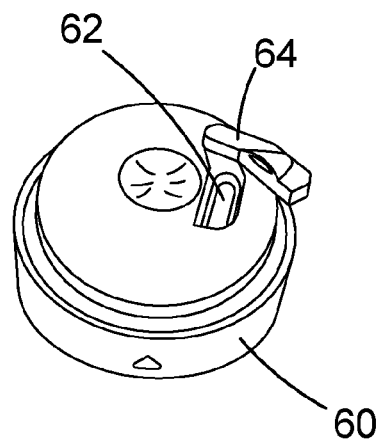
FIG.10b
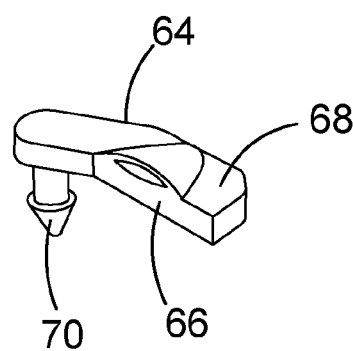
FIG.10c

TOOTHBRUSH COACHING SYSTEM

The invention relates to a device for use with a toothbrush for providing an indication of brushing activity.

In order for a user to maintain good oral health it is important that they are brushing their teeth correctly. In general children are shown how to use a toothbrush, and understand that their teeth need to be brushed, but there is very little active tuition on how to brush one's teeth. Thus, a user may likely pick up bad brushing habits over a period of many years. Typical bad habits include not brushing the teeth for long enough and not ensuring that all teeth, particularly back teeth, have been brushed. If these bad habits are not picked up at an early stage and corrected then the oral health of the user may suffer.

To help a user brush their teeth attempts have been made to monitor how the user brushes their teeth and relay this information back to the user. The idea is that if a user can see how they are currently brushing their teeth, they may be able to self-correct.

Previous attempts to monitor brushing techniques have included attaching a motion sensor to a toothbrush which monitors how the user is brushing their teeth. Often, the data from the motion sensor is sent to an application (app) or computer program, which is run on an external device e.g. a mobile phone or other portable device. The app or program then provides feedback to the user about how they have brushed their teeth. In general, in order for the app or program to provide real time feedback, the toothbrush must have some form of wireless data connection so that it may communicate with the external device and send the data from the motion sensor to the app in real time. Typically, the data connection is either a Bluetooth connection or Wi-Fi connection.

Thus, current systems for providing feedback to a user rely on the provision of a wireless data connection being available. Without a connection, the app or program is not able to receive the brushing data from the motion sensor and so will not be able to provide feedback to the user.

If a user either does not have a mobile device available which can run the app, or they are in an area which does not have an online data connection available to them, the user will not be able to receive feedback regarding their brushing technique. These situations may arise when the user is travelling or away from their usual home.

In addition, the feedback provided to a user may be limited. The feedback may alert the user to the fact that they are not brushing their teeth correctly but may not provide the user with information on how they may correct the deficiency. As such, it is often left up to the user to try and work out how they can improve their brushing technique. This may result in different deficiencies if the user is not sure what correction to apply.

Furthermore, known systems for providing feedback regarding brushing activity to a user tend to be expensive due to the provision of various different sensors, or else may suffer from inaccuracies where fewer and/or lower cost components are used.

As a result, there is a need for a system which may provide feedback to a user about their brushing techniques which does not rely on the provision of a data connection. There is also the need for a system which may provide real time coaching to the user on how to improve their brushing technique. Furthermore, it would be desirable to provide a system in which accuracy can be improved while minimising the need for additional components.

According to one aspect of the present invention there is provided a device for providing an indication of brushing activity of a toothbrush, the device comprising:
  an accelerometer configured to produce acceleration data from motion of the toothbrush;
  means for filtering the acceleration data to produce gravitational components;
  means for filtering the acceleration data to produce linear acceleration components;
  means for projecting the gravitational components and the linear acceleration components into an n-dimensional space, where $n \geq 2$;
  means for performing a clustering process on the projections of gravitational components and linear acceleration components into n-dimensional space to produce clustering results, the clustering results comprising a plurality of clusters each of which represents a brushing area;
  means for determining a brushing area based on an assignment of subsequent gravitational components and linear acceleration components of acceleration data to a particular cluster; and
  means for providing feedback to a user based on the determination of brushing area, thereby providing an indication of brushing activity.

The present invention may provide the advantage that, by separating the acceleration data into gravitational components and linear acceleration components, projecting the separated components into n-dimensional space, performing a clustering process on the projected data, and determining a brushing area based on an assignment of subsequent gravitational components and linear acceleration components of acceleration data to a particular cluster, it may be possible to obtain a more accurate determination of brushing activity without significantly increasing the cost of the device. In particular, the present invention may provide more accurate results through the provision of some additional processing which can be provided at relatively low cost, while avoiding the relatively high cost of additional sensors. Furthermore, the device may be able to provide feedback to a user about their brushing techniques without the need for a data connection to an external device.

Preferably the gravitational components of the acceleration data provide an indication of the inclination of the toothbrush, and the linear acceleration components of the acceleration data provide an indication of how the toothbrush is being moved (brushing dynamics). Thus, both inclination and brushing dynamics can be taken into account when determining brushing activity.

Preferably n is a natural number and may be for example 2, 3, or any other (higher) natural number.

Preferably the gravitational components and the linear acceleration components are projected into a polar or spherical coordinate system. For example, where $n=2$, the 2-dimensional space may use a polar coordinate system, and where $n=3$ the 3-dimensional space may use a spherical coordinate system.

Where $n=2$, the angular coordinate in a polar coordinate system may be calculated from the gravitational components of the acceleration data projected into two-dimensional space, and the radial coordinate in the polar coordinate system may be calculated from the magnitude of linear acceleration components of the acceleration data. Thus, the angle in the polar coordinate system may be based on the orientation of the toothbrush, and the radial component may be based on the movement of the toothbrush.

Alternatively, where n=3, the angular coordinates in the three-dimensional space may be calculated from the gravitational components of the acceleration data, and the radial coordinate in the three-dimensional space may be calculated from the linear acceleration components of the acceleration data (when considered in a spherical coordinate system). Thus, the angles in the three-dimensional space may be based on the orientation of the toothbrush, and the radial components may be based on the movement of the toothbrush. For example, the angular coordinates in the three-dimensional space may be the angular coordinates of a three-dimensional vector representing a gravitational component of the acceleration data.

It has been found that taking into account both orientation and brushing dynamics may provide an improved way of determining the area of the mouth which is being brushed, while using a single accelerometer.

The device may further comprise means for storing the clustering results, and means for comparing subsequent gravitational components and linear acceleration components of acceleration data with the stored clustering results. In this case, a separate comparison step may be used to determine the brushing area. Alternatively, the brushing area may be determined as part of the clustering process, in which case a separate comparison step may not be necessary (the comparison being carried out as part of the clustering process).

According to another aspect of the present invention there is provided a device for attachment to a or integrated with a toothbrush for providing an indication of brushing activity, the device comprising:

a motion sensor configured to detect motion of the toothbrush and produce motion data;

means for producing, from the motion data, estimates of brushing dynamics;

means for producing, from the motion data, estimates of average acceleration;

means for performing a clustering process on the estimates of brushing dynamics and the estimates of average acceleration to produce clustering results, the clustering results comprising a plurality of clusters each of which represents a brushing area;

means for storing the clustering results;

means for comparing subsequent estimates of brushing dynamics and estimates of average acceleration with the stored clustering results; and means for providing feedback to a user based on a result of the comparison, thereby providing an indication of brushing activity.

The present invention may provide the advantage that feedback may be provided to a user about their brushing activity without requiring connection to a separate device. By providing the user with relevant feedback related to their brushing activity, the user may act upon the feedback and adjust their brushing technique to help ensure they are brushing their teeth in an optimal way. This may improve, or maintain, the oral health of the user. Thus, the device for attachment to a toothbrush for providing an indication of brushing activity may be thought of as a toothbrush coaching system.

In any of the above aspects, the device may be a complete, self-contained system for attachment to or integrated with a toothbrush, which is able to monitor the user's brushing activity, analyse this brushing activity, and provide relevant feedback based on the analysis. Therefore, there is preferably no requirement of an external device to either process the data or to provide feedback to the user. This may provide the advantage that the device may provide feedback to a user about their brushing activity without relying on the provision of an external device or a data connection. This may allow the device to be used in areas where a data connection is not available. This may also allow the device to be used by users that do not have a suitable external device capable of performing the required processing and feedback functions. Further, a self-contained system may be a relatively simple system so that the device may be easily operated by users of any age, particularly younger users.

The device may be part of a separate unit which is arranged to attach to a toothbrush. Alternatively, the device may be integrated with the toothbrush, in which case the toothbrush and the device may be supplied as s single unit.

The motion sensor may be an accelerometer. The motion data may be acceleration data. It may be advantageous to use an accelerometer as they are a readily available type of motion sensor. The motion sensor may be a gyroscope or any other suitable motion sensor. The motion data may be gyroscopic data or any other suitable motion data.

The motion data, or acceleration data, may comprise linear acceleration data and gravitational acceleration data. The gravitational acceleration component of the acceleration data may give an indication of how the toothbrush is orientated with respect to the Earth's gravity. The linear acceleration component may give an indication of how the toothbrush is being moved during brushing.

The device may comprise at least one low pass filter configured to filter the motion data before the estimates are produced. The at least one low pass filter may be used to separate out the gravitational acceleration component of the data from the motion data.

The device may comprise a high pass filter configured to filter the motion data before the estimates are produced. The high pass filter may be used to separate out the linear acceleration component of the data from the motion data.

A second low pass filter may be configured to filter the linear acceleration data. The second low pass filter may be used to reduce noise present in the linear acceleration data. Reducing noise present in the data may provide an improved signal which may lead to improved processing. The second filter may be configured to filter the data before the estimates of brushing dynamics and average acceleration are produced. Filtering the data before it is processed may help to improve the signal by reducing noise which may provide more accurate results. The device may comprise further low pass filters or further high pass filters.

The brushing dynamics may provide an indication of how strong or fast or vigorously the user is brushing their teeth. The brushing dynamics estimation may be the averaged magnitude of the linear acceleration. The average acceleration may be calculated by averaging the gravitational acceleration data. Brushing dynamics and average acceleration may be used in the clustering process because these quantities may be easily derivable from the accelerometer data and may lead to improved results. Thus very little pre-processing may be required before the clustering process takes place. This may speed up the steps of processing the data, producing the clustering result, and providing feedback to the user. Fewer computations may also help allow the processing to take place on the device itself, which may have limited processing capacity.

The clustering process may use cosine distance to produce clustering results. The cosine distance may be used because it requires less time and processing power to process the motion data and produce clustering results compared with using Euclidean distance to compute the results. The clustering results may therefore be produced using fewer computational resources. This may allow the computations to take place on the device itself, rather than requiring the computations to be carried out on an external device.

The regions associated with a particular cluster may be pre-defined. Thus, the region of the mouth represented by each cluster may be pre-stored on the device. This means that when the user uses the device for the first time, the user can begin using the device straight away and their brushing data can be compared to the pre-stored clustering results so that an indication of brushing activity can be provided. This may have the advantage that the user does not need to calibrate, or set up, the device themselves when they are using the device for the first time. This may reduce the risk of incorrectly setting up the device when the device is used for the first time.

The clustering process may use a distance threshold to determine which cluster the data belongs to. The data may be determined to be part of a cluster if the distance threshold is not exceeded. The data may be determined to not be part of a cluster if the distance threshold is exceeded. The distance thresholds may be pre-programmed, or pre-stored, in the device. This means that when the user uses the device for the first time, the user can begin using the device straight away without the need to set the device up themselves.

The user's acceleration data from a particular brushing session may be combined with the pre-stored acceleration data. This may mean that once there is sufficient user specific acceleration data present, the clustering process may be run on the user specific data to generate user specific clustering results. The user's acceleration data may replace the pre-stored acceleration data and the user's clustering results may replace the pre-stored results. This may provide the advantage that the clustering results generated using the user specific acceleration data may provide a more accurate mapping between the acceleration data and the user's mouth. This may allow the clustering process to use the user specific clustering results instead of the pre-defined clustering results to perform the comparison. This may mean that the clustering results are specific to the user and so more accurate feedback can be provided to the user.

The distance threshold may be updated based on historical clustering results. For example, the distance threshold may be reduced if a user is very consistent with their brushing technique and has well defined brushing motions for each area of the mouth. Alternatively, the distance threshold may be increased if a user has a more erratic style of brushing and their brushing motions for each area of the mouth are not well defined. Updating the distance threshold based on the user's brushing style may help ensure that the clustering process is tailored to an individual user. The clustering process may be able to take into account different styles of brushing technique and so the device may therefore provide more accurate and tailored feedback to a particular user.

The clustering results may comprise at least four clusters. The at least four clusters may represent at least the following areas of the mouth: outer left, outer right, inner top, inner bottom. The clustering results may therefore represent the main areas of the mouth that the user will be brushing. Using clusters to represent different regions of the mouth may provide a clear way of determining which area of the mouth is being brushed. The clustering results may comprise 5 clusters. The fifth cluster may indicate that no brushing is taking place. The clustering results may also indicate whether the user is brushing the front or the back of their teeth. The clustering results may also indicate whether the user is brushing their top teeth or their bottom teeth. The clustering results may include additional, or different, clusters which may represent additional, or different, areas of a user's mouth.

The comparison process may provide an indication of the area of the mouth which is being brushed. The comparison process may use dynamic clustering to determine which area of the mouth is being brushed. Thus, the indication of which area of the mouth is being brushed may depend on the previous comparison result and the current acceleration data. Thus an immediately preceding comparison result may be used to determine an immediately following comparison result. This may allow the device to predict which region of the mouth is being brushed if it receives data which are equidistant from two clusters.

The means for producing estimates of brushing dynamics may be a pre-filtering module. The pre-filtering module may comprise at least one processor. The means for producing estimates of average acceleration may be a pre-filtering module. The pre-filtering module may comprise at least one processor. The same pre-filtering module may be used to provide each estimate. It may be advantageous to use one or more processors to produce the estimates as these components are readily available. The use of one or more processors may also help reduce the number of different components needed in order for the device to operate which may help keep the manufacturing process relatively simple. Any other suitable means may be used to produce estimates of brushing dynamics and average acceleration.

The means for performing a clustering process may be a clustering module. The clustering module may comprise at least one processor. The means for comparing subsequent estimates of brushing dynamics and estimates of average acceleration with the stored clustering results may be a comparison module. The comparison module may comprise at least one processor. The means for storing the clustering results may be a memory device. The device may therefore be made of simple, readily available components.

The means for producing estimates may be configured to determine whether the detected motion data corresponds to motion related to brushing before the clustering process is performed. It may be determined that the detected motion data corresponds to motion related to brushing if the detected motion data falls outside a plurality of motion thresholds. The motion thresholds may be acceleration thresholds. The motion data may be required to fall outside the plurality of motion thresholds for a first time period. The first time period may be between 1 and 5 seconds. The first time period may be two seconds. This may ensure that only relevant motion data is being processed by the processors. Here, relevant data may be motion data related to brushing motions. Thus, for example, motion data corresponding to a toothbrush being moved from location A to location B will not be used to produce estimates of brushing dynamics and average acceleration. Processing only relevant data will help to provide accurate clustering results. More accurate clustering results may lead to more accurate, and relevant, feedback being provided to the user.

The means for providing feedback may be a feedback module. The feedback module may comprise a feedback device. The feedback module may be configured to provide feedback to a user in real time. This may ensure that the feedback that the user receives is directly related to their current brushing activity. The user may therefore be able to react immediately and make appropriate adjustments to their brushing technique in real time. Real time feedback may make it much easier for a user to adjust their brushing technique as the user may not have to rely on remembering historical feedback and what they did wrong in historical brushing sessions.

The feedback device may be configured to alert the user if they are brushing at a speed that is greater than a maximum speed. If the user brushes their teeth too hard or too vigorously they may potentially be causing harm to the inside of their mouth.

The feedback device may be configured to alert the user if they have been brushing for a total brushing time that is greater than a maximum total time for the whole brushing session. The maximum total brushing time may be two minutes. If a user brushes their teeth for too long they may risk damaging their teeth by eroding away the sensitive outer layer. The feedback device may be configured to alert the user if they have been brushing for a total time that is less than the maximum total time for the whole brushing session. If the user brushes their teeth for less than the maximum total time then they may not clean their teeth properly.

The feedback device may be configured to alert the user if they have been brushing for a time that is greater than a maximum time for a particular area of the mouth. The feedback device may be configured to alert the user if they have been brushing for a time that is less than a minimum time for a particular area of the mouth. This may ensure that the user is brushing all areas of their mouth during the brushing session, rather than focusing on one particular area. Equal amounts of time may be spent brushing each of area the mouth. Each area of the mouth may be brushed for 30 seconds. The device may therefore ensure that all areas of the mouth have received proper attention.

The feedback device may be configured to provide an alert to a user based on any other suitable brushing parameters. The feedback provided to the user may ensure that they are brushing their teeth correctly by ensuring that all areas of the mouth have been brushed for a sufficient amount of time. The feedback may also help ensure that the user does not rush through the process of brushing their teeth and instead gives proper time and attention to all regions of the mouth. The feedback may also help prevent potentially causing harm to the inside of the mouth through incorrect brushing teeth, for example when brushing to hard or too vigorously.

The means for providing feedback may be a visual feedback device. The visual feedback device may comprise at least one LED. The at least one LED may be positioned on an external surface of the device. This may allow the LED to be easily seen by the user so they can clearly see the feedback being given. The at least one LED may produce coloured light. Different coloured light may be used to provide different instructions so that a user may easily be able to distinguish between the feedback instructions being given to them.

The means for providing feedback may be an audio feedback device. The audio feedback may be one or more voice commands. The feedback device may a vibration device. The vibration feedback may be one or more vibration pulses. Audio and vibration feedback provide the advantage that a user can receive the feedback even if they cannot see the device. This may happen if, for example, the device is obscured by the user's hand. The feedback device may a combination of visual and/or audio and/or vibration feedback devices. Feedback using visual, audio, vibration, or any combination of the aforementioned feedback is a relatively simple form of feedback. The user may therefore be able to quickly understand the feedback instructions and act upon them. The aforementioned forms of feedback may also only require a short amount of time in order for the user to understand them, helping the user act as soon as possible to the feedback instructions. Short, simple feedback instructions also mean that the device is able to provide instructions at any given moment during the brushing session, without having to wait for a previous lengthy instruction to finish being given. The feedback device may be any other suitable feedback device.

The device may store a summary of the brushing session. The memory may be configured to store a summary of historical brushing sessions. The device may be able to use the stored summaries and historical results to update parameters used in the clustering process. This may ensure that the clustering process and feedback are tailored to the user.

The device may store a complete history of the brushing region per second during the brushing session. That is, the device may store a complete history of what part of the mouth was brushed and when, from the time the brushing session started until the time the brushing session was completed. This information may be provided to the user so that they may view the brushing pattern of their brushing session.

The device may store a complete history of the speed of the brushing motion at each second for a particular brushing session. That is, the device may store a complete history of how fast the user was brushing their teeth each second, from the time the brushing session started until the time the brushing session was completed. This information may be provided to the user so that they may view how their brushing speed changes over the course of the brushing session. The user may also be able to see how their brushing speed changes depending on which area of the mouth is being brushed.

The device may comprise a clock configured to timestamp the clustering results. Timestamping the clustering results may ensure that the results can be stored in the correct order. The device may also store the time at which the brushing activity of a particular session was started and completed. This information may be provided to the user so that they may see the total amount of time that the brushing session lasted.

The device may comprise a means for communicating the clustering results to an external device. The means for communicating the clustering results may be a transceiver. The external device may be a portable device such as a smartphone device, or any other suitable portable device. This may allow the clustering results to be transmitted to the external device for cloud storage.

The device may comprise a means for communicating the result of the comparison to an external device. The means for communicating the results of the comparison may be a transceiver. The external device may be a portable or mobile device. This may allow the results of the comparison to be transmitted to the external device for cloud storage.

According to another aspect of the present invention there is provided a method of providing an indication of brushing activity with a toothbrush, the method comprising the steps of:

using an accelerometer to produce acceleration data from motion of the toothbrush;
filtering the acceleration data to produce gravitational components;
filtering the acceleration data to produce linear acceleration components;
projecting the gravitational components and the linear acceleration components into n-dimensional space;

performing a clustering process on the projections of gravitational components and linear acceleration components into n-dimensional space to produce clustering results, the clustering results comprising a plurality of clusters each of which represents a brushing area;

determining a brushing area based on an assignment of subsequent gravitational components and linear acceleration components of acceleration data to a particular cluster; and providing feedback to a user based on the determination of brushing area, thereby providing an indication of brushing activity.

According to a further aspect of the invention there is provided a method of providing an indication of brushing activity with a toothbrush, the method comprising the steps of:

detecting motion of the toothbrush and producing motion data;

producing, from the motion data, estimates of brushing dynamics;

producing, from the motion data, estimates of average acceleration;

performing a clustering process on the estimates of brushing dynamics and the estimates of average acceleration to produce clustering results, the clustering results comprising a plurality of clusters each of which represents a brushing area;

storing the clustering results;

comparing subsequent estimates of brushing dynamics and estimates of average acceleration with the stored clustering results; and providing feedback to a user based on a result of the comparison, thereby providing an indication of brushing activity.

According to another aspect of the present invention there is provided a computer program comprising instructions which, when the program is executed by a computer, cause the computer to carry out the steps of the method as described herein.

According to another aspect of the present invention there is provide a computer-readable medium comprising instructions which, when executed by a computer, cause the computer to carry out the steps of the method as described herein.

Features of one aspect of the invention may be provided with any other aspect. Apparatus features may be provided with method aspects and vice versa.

Embodiments of the present invention will now be described, by way of example only, with reference to the accompanying drawings in which:

FIG. 9 is a table of feedback instructions; and

FIGS. 10*a-c* are perspective views of a protective flap.

Figure 1:
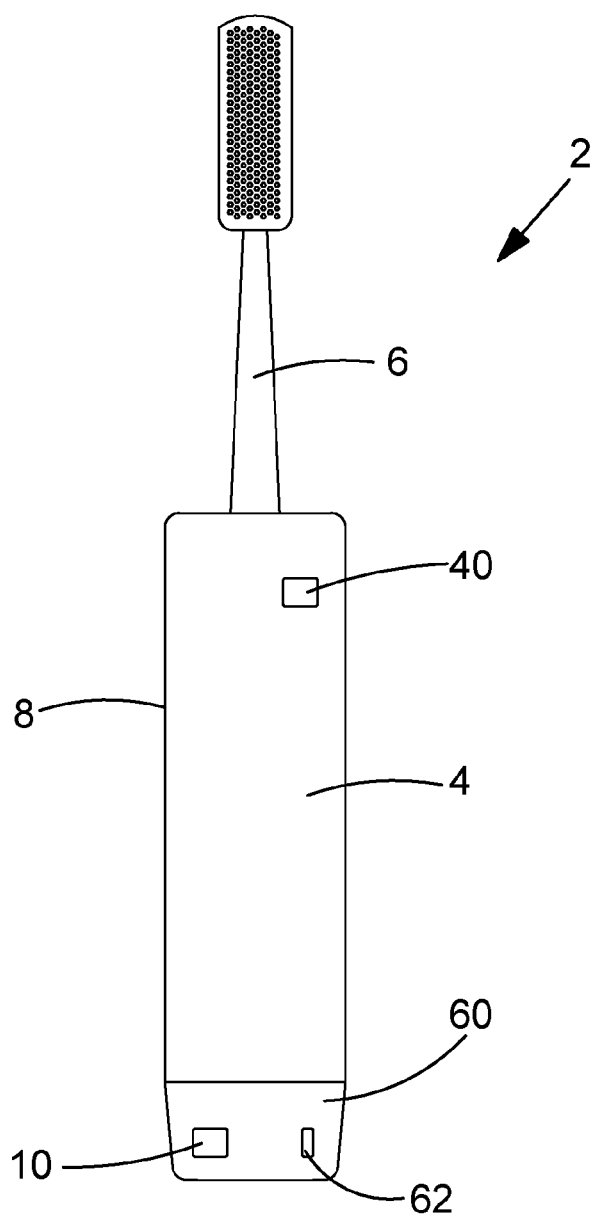
FIG. 1 is a diagrammatic view of a toothbrush coaching system.

FIG. 1 shows parts of a toothbrush coaching system 2 in an embodiment of the invention.

Referring to FIG. 1, the toothbrush coaching system 2 comprises a toothbrush 6 and a coaching device 4. The coaching device 4 comprises a housing 8 for receiving the toothbrush 6 and an end cap 60. The housing 8 is detachable from the toothbrush 6 so that the housing 8 can be used with a variety of different toothbrushes. The end cap 60 comprises a printed circuit board (PCB) 10. The coaching device 4 may be provided in the form of a toothbrush holder, such as that disclosed in GB 2541416, the subject matter of which is incorporated herein by reference. Alternatively, a toothbrush with a built in coaching device could be provided instead.

Figure 2:
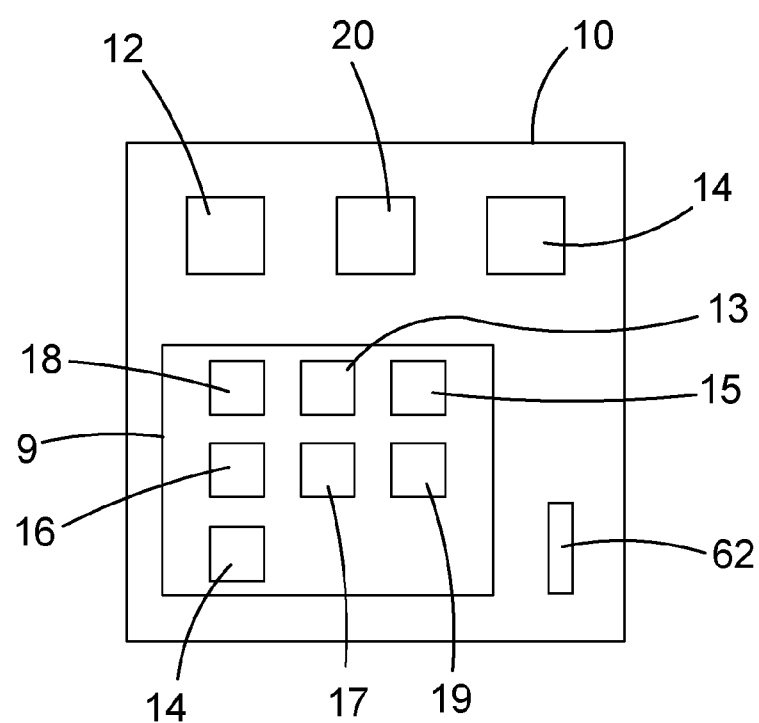
FIG. 2 is a diagrammatic view of a printed circuit board.

The PCB 10 comprises a Bluetooth Low Energy (Bluetooth 4.0/Bluetooth Smart) module 12, processors 14, a clock or timer 20, and a processing module 9, as illustrated in FIG. 2. The coaching device is powered by a rechargeable battery (not shown). The rechargeable battery, a charging circuit (not shown), a charging inductor ring (not shown), and a micro-USB charging station 62 are contained within the end cap 60 on the PCB 10. The end cap 60 is configured to be releasably attached to the housing 8. Thus, the PCB 10 is detachable from the toothbrush 6. This allows the rechargeable battery to be disconnected from the coaching device 4 and charged up as and when is needed.

Figure 3:
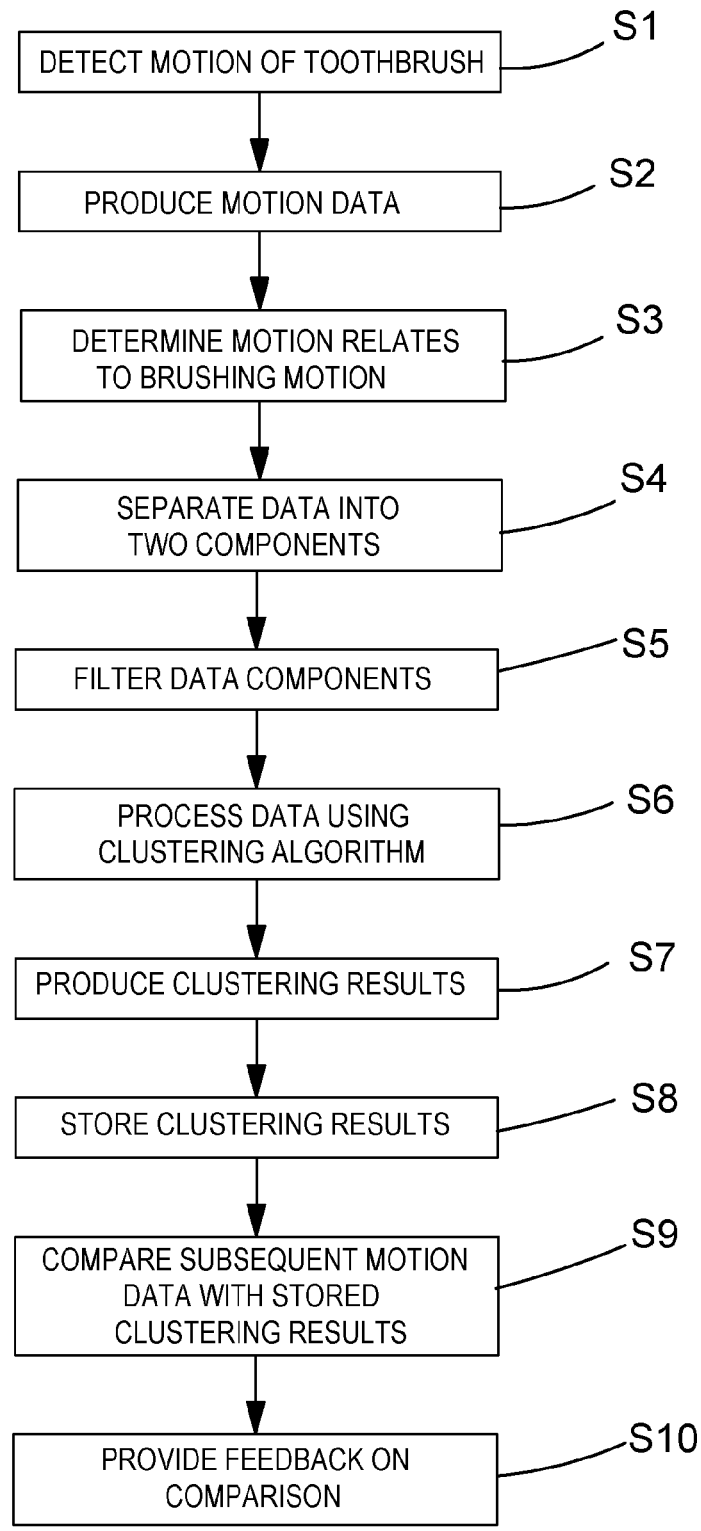
FIG. 3 is a flow diagram of a feedback process.

The coaching device 4 is a data processing system configured for attachment to (or integration with) a toothbrush 6. The general process of coaching a user on their brushing technique is illustrated in FIG. 3. The aim of the coaching system is to provide real-time tooth-brushing instructions to the user while they are brushing their teeth so that a user can act upon the received instructions. When the user is brushing their teeth, motion of the toothbrush is detected S1 and motion data is produced S2. In this embodiment, the motion data is acceleration data. Once it has been determined that the motion data relates to brushing motions S3, the acceleration data is separated into two components S4. The two data components are then first filtered S5 and then fed into an algorithm for processing S6. Processors 14 analyse the acceleration data using a clustering algorithm and produce clustering results S7. The clustering results comprise a plurality of clusters each of which represents a brushing area. The clustering results are then stored S8. Subsequent motion data are then compared with stored clustering results S9. This may be done as part of the clustering process (i.e. when assigning a new data point to a particular cluster). Alternatively, a separate comparison step could be carried out. The comparison of the subsequent data and the stored clustering results provides an indication of which part of the mouth is being brushed. Feedback is then provided to the user based on this indication S10. A more detailed description of how the real-time coaching operates will be provided later.

The coaching device 4 described herein is a data processing system which can operate in offline mode. Here "offline" means that it does not need a wireless data connection. That is, the system 2 does not need to be connected to an external device such as a smartphone, tablet, or any other mobile device, to be able to carry out the processing and feedback functions.

Although the toothbrush coaching system 2 operates in offline mode, the system 2 is periodically connected online to update the coaching function. The coaching function includes the clustering process and the feedback provided to the user based on the clustering process. The Bluetooth module 12 comprises a transceiver which is configured to transmit data to and receive data from an external device. The Bluetooth module 12 uses radio frequencies to connect the toothbrush coaching system 2 to the external device and download updates onto the coaching system 2. The external device is a mobile device (e.g. smartphone or tablet). The Bluetooth module 12 also transmits data stored in the memory 16 to the mobile device for cloud storage.

The coaching device 4 comprises a clock 20. The clock 20 is used to timestamp the acceleration data that has been produced. Before the data processing system is used for coaching for the first time, it first needs to synchronise the time on the internal clock 20 with an external reference source to get an accurate measure of real time. For example, when the coaching device 4 is connected to a smartphone or tablet, it will acquire the correct, real-world time from the clock on the smartphone or tablet. This time will then be used to update the time on the internal clock 20 on the coaching device 4. The coaching device 4 then applies the correct time stamps to the brushing motion data that has been collected. This allows a user to view the time at which they brushed their teeth.

When the coaching device 4 is out of power, the internal clock 20 will be out of sync with "real time". This means if the coaching device 4 is used for brushing once it has been charged up, but has not been re-synced, the recorded brushing sessions will have an incorrect time stamp ("since boot" instead of "real time"). When the device 4 is connected to an online connection the timestamps are corrected. To correct the time stamps, the device 4 calculates the difference between the real world time and the time on its internal clock 20. This time difference is then added onto the timestamps recorded by the internal clock 20. Thus, when the device 4 is connected to an online connection, the recorded data sessions' timestamps are re-evaluated, so that they are stored with the correct timestamp with the user profile/in the cloud. This provides the user with a correct history of their brushing sessions.

In order to conserve power and memory, the coaching device 4 only starts performing the clustering process once it has established that brushing is actually taking place. This ensures that the coaching device 4 does not start processing motion of the toothbrush system 2 which is not related to brushing motion, for example if the user moves the toothbrush system 2 from one room to another. Performing an assessment of whether or not the motion of the toothbrush 6 is relevant to brushing before data is processed ensures that only relevant data is being processed. This prevents the toothbrush device 2 from processing and storing data that is not needed, which will use up valuable memory, processing power, and battery life.

Before the coaching device 4 can be used, it first needs to be turned on. Here "turned on" means that the device 4 has been brought out of sleep mode and is fully operational. Thus the device 4 has been "woken up". Sleep mode is a power saving mode in which parts of the coaching device 4 are switched off until they are needed. To turn on the device 4, the user simply needs to pick up the device 4. The processing module 9, which runs in the background during sleep mode, detects that the coaching device 4 has gone from a period of inactivity to a period of activity. The processing module 9 therefore powers up the entire coaching device 4 so that it can be used during brushing. To turn off the device 4 so that it enters sleep mode, the user simply leaves the device 4 stationary for an extended period of time. The processing module 9 detects that the device has gone from a period of activity to a period of inactivity and therefore switches off modules of the coaching device 4 which are no longer needed.

In order to determine whether motion of the toothbrush system 2 corresponds to brushing motions, the coaching device 4 captures data relating to the motion, or acceleration, of the toothbrush system 2 for a certain period of time. Typically, the data is collected for a period of two seconds, but any other suitable time period could be used. This initial acceleration data is then compared to pre-defined acceleration limits, typical of tooth-brushing motions, to determine if the initial data captured corresponds to brushing motion. If the coaching device 4 detects that motion related to brushing the teeth has started, the coaching device 4 then processes the data by performing a clustering process on this data. The clustering is performed by comparing a data point with predefined points (clusters) representing a brushing area. The data point is assigned to the closest cluster (e.g. to a cluster with the shortest cosine distance). The results of the clustering process are used in the comparison stage, indicating which area is being brushed, and relevant feedback subsequently provided.

Thus, the toothbrush coaching system 2 is able to automatically activate the offline coaching function once it has determined that the user has started to brush their teeth. Automatic activation of the coaching function eliminates the need for the user to proactively start the coaching function, ensuring that all relevant data is processed which will lead to more relevant feedback.

Figure 4:
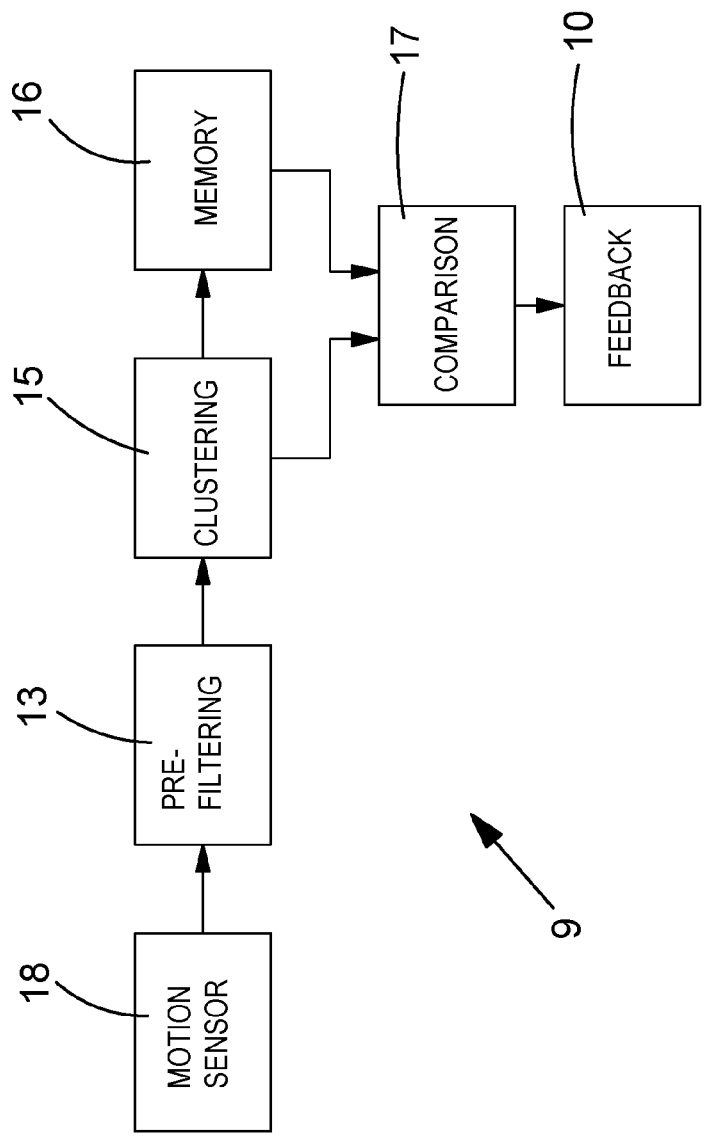
FIG. 4 is a schematic view of a processing module.

FIG. 4 illustrates an embodiment of a processing module 9 which is used to carry out the coaching function. The processing module 9 comprises a motion sensor 18, which in this case is an accelerometer 18. The accelerometer 18 produces acceleration data. The accelerometer 18 is connected to a pre-filtering module 13 so that acceleration data generated by the accelerometer 18 is passed on to the pre-filtering module 13. The pre-filtering module 13 performs a pre-filtering process on the acceleration data received from the accelerometer 18. This pre-filtering process will be described in more detail later. The pre-filtering module 13 is connected to both a clustering module 15 and a comparison module 17. Thus data passed from the pre-filtering module 13 is passed on to both the clustering module 15 and the comparison module 15. The clustering module 15 performs a clustering process on the data received from the pre-filtering module 13. The clustering module 15 is connected to a memory 16. The clustering process produces clustering results which are passed from the clustering module to the memory 16 for storage. The memory 16 is connected to the comparison module 17. The memory 16 passes the stored clustering results to the comparison module 17. Thus, the comparison module 17 receives filtered data from the pre-filtering module 13 and stored clustering results from the memory 16. The comparison module 17 compares the data from the pre-filtering module 13 with the clustering results from the memory 16 and produces a comparison result. The comparison result provides an indication of which area of the mouth the user is brushing. The comparison module 17 is connected to a feedback module 19. The comparison module 17 passes the comparison result to the feedback module. The feedback module provides feedback to the user, based on the comparison result.

In the arrangement shown in FIG. 4, a separate comparison module is used to compare the data from the pre-filtering module 13 with the clustering results from the memory 16. This can allow different comparison parameters or techniques to be used in the clustering process and the comparison process. Alternatively, the determination of which area is being brushed may be carried out during the clustering process itself. Thus, the assignment of a new data point to a particular cluster (as part of the clustering process) may also indicate which area of the mouth is being brushed. In this case a separate comparison module may not be necessary, and the clustering module 15 may output an indication of which area of the mouth the user is brushing directly to the feedback module 19.

In a preferred embodiment the motion sensor is a three-axis accelerometer. The output of the accelerometer can be expressed as:

$$d=a+g+e$$

where d is the raw (measured) acceleration data, a is the acceleration due to movement of the accelerometer, g is the gravity component, and e is an error term. In the case of a three-axis accelerometer, d, a, g and e are each three-dimensional vectors.

Figure 6:
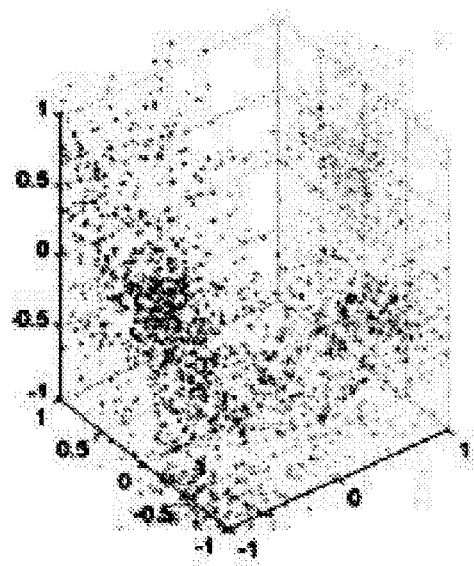
FIG. 6 is a plot of motion data.

To being with, raw motion data 22 such as raw acceleration data d from the accelerometer 18, are received by the processor 14 and converted to floating point numbers in x, y, and z directions. FIG. 6 illustrates the raw acceleration data before the pre-filtering, clustering process, and comparison has taken place. The accelerometer 18 measures the acceleration of the coaching device 4. From the acceleration data, the pre-filtering module extracts a gravitational acceleration component g and a linear acceleration component a, as will explained below. The gravitational acceleration component of the acceleration data gives an indication of how the toothbrush system is orientated with respect to the Earth's gravity. The gravitational component is therefore used to determine the orientation of the toothbrush. The linear acceleration component gives an indication of how the toothbrush system is being moved, or shaken, during brushing.

The gravity component is isolated from the accelerometer data by low-pass filtering the accelerometer data using the following formula:

$$g_{x,new} = \text{coeff} \cdot g_{x,old} + (1-\text{coeff})\text{accel}_x,$$

where $g_{x,new}$ is the newly calculated x component of gravity, $g_{x,old}$ is the previous value of the x component of gravity, $\text{accel}_x$ is the current value of the acceleration in the x direction, and coeff is the filter coefficient.

The filter coefficient is given by $$\text{coeff} = \frac{T}{T + \Delta t},$$

where T is the filter time constant, and $\Delta t$ is the sample update time. Using a filter time constant of 0.4 s and sample update of 0.1 s gives a filter coefficient of 0.8. Of course it will be appreciated that other filtering parameters may be used as appropriate.

Gravity components in the y and z directions can be calculated in a similar way.

The linear acceleration component is calculated by subtracting the gravity component from the acceleration data, giving $$\text{linear}_x = \text{accel}_x - g_{x,new},$$

where $\text{linear}_x$ is the x component of linear acceleration. The linear acceleration in the y and z directions can be calculated in a similar way.

In addition to computing the gravity and linear acceleration, the square root of the sum of the squares of the filtered linear acceleration components in each of the x, y, and z directions is calculated. The sum of the square of the difference between consecutive samples of linear acceleration in the x, y, and z direction is also calculated, to determine whether the user is brushing or not.

Figure 5:
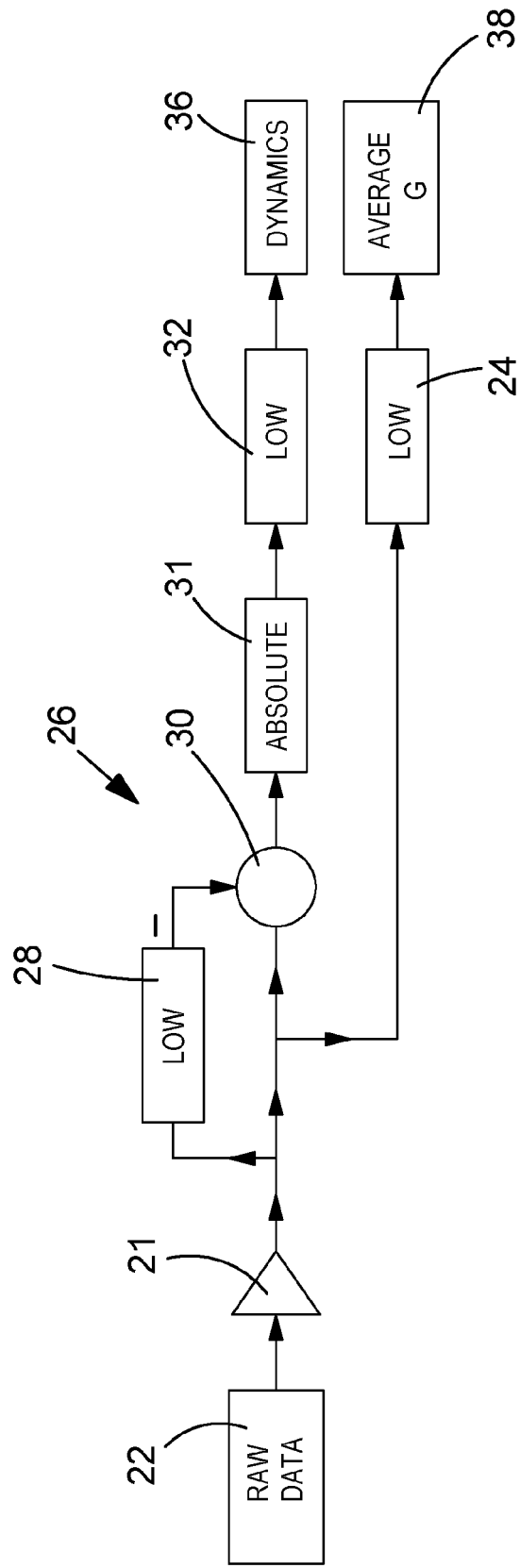
FIG. 5 is a schematic view of a pre-filtering module

FIG. 5 illustrates the pre-filtering module 13. The pre-filtering module comprises an amplifier 21, first 24, second 28, and third 32 low pass filters, and a subtractor 30. The amplifier 21 is connected to first 24 and second 28 low pass filters and to the subtractor 30. Thus, the data from the amplifier 21 is passed to both the first 24 and second 28 low pass filters and the subtractor 30. The second low pass filter 28 is also connected to the subtractor 30. The second low pass filter 28 can therefore pass data to the subtractor 30. Thus, the subtractor receives data from the amplifier 21 and the second low pass filter 28. The subtractor 30 is connected to the third low pass filter 32. Thus, data from the subtractor 30 is passed to the third low pass filter 32.

The gravitational and linear acceleration components are isolated from the raw acceleration data 22 using low-pass 24 and high-pass 26 filters. Before the components are isolated, the raw acceleration data 22 is first scaled to the correct amplitude, using an amplifier 21.

The gravitational component of the raw acceleration data 22 is isolated from the acceleration data 22 by passing the acceleration data 22 through a low-pass filter 24. A low pass filter 24 is used because the gravitational acceleration component of the acceleration data 22 has a frequency that is smaller than that of the linear acceleration component. The cut-off frequency of the low pass filter 24 is such that it passes the gravity component of the raw sensor data 22, but not the acceleration component due to manual movement of the toothbrush. The x, y, and z components of the raw acceleration data 22 are filtered separately so that the x, y, and z gravitational components are isolated separately.

The gravitational components of the raw acceleration data 22 provide averages value of gravitational acceleration in the x, y, and z directions (the low pass filter works as a type of moving average filter). The gravitational components in the x, y, and z directions are passed onto the clustering module 15 for processing.

The linear acceleration component is isolated from the raw acceleration data 22 by first passing the data through a low pass filter 28. The cut-off frequency of the low pass filter 28 is such that acceleration due to gravity is passed, while acceleration due to manual movement of the toothbrush is not. The thus filtered data are then subtracted from the raw acceleration data 22, using subtractor 30. Thus, this operation removes acceleration due to gravity from the raw acceleration data 22, leaving a linear acceleration component. The combination of the low pass filter 28 and subtractor 30 creates the high-pass filter 26. The x, y, and z, components of the raw acceleration data 22 are filtered separately so the x, y, and z linear acceleration components are isolated separately.

The filtered x, y and z linear acceleration components are then passed to absolute value calculation module 31. The absolute value calculation module 31 calculates the absolute value of the linear acceleration by finding the square root of the sum of the squares of the x, y, and z components. The absolute value of the linear acceleration is then passed onto a low-pass filter 32. The low-pass filter 32 only passes data which falls below a certain cut-off frequency. Thus, the low-pass filter 32 is used to reduce noise present in the data. The filtered absolute value then provides the final value of the brushing dynamics 36. The brushing dynamics 36 provide an indication of how strong or fast or vigorously the user is brushing their teeth. Thus, the final scalar value of the brushing dynamics estimation 36 is produced by calculating the dynamics estimation vector length.

Thus, the pre-filtering includes the process of passing the data through filters and calculating the brushing dynamics 36 and the average gravitational acceleration 38 as well as the gravitational components in the x, y, and z directions, and is carried out by the pre-filtering module 13.

As mentioned previously, the clustering module 15 only performs the clustering process on the filtered data received from the pre-filtering module 13 if it is determined that the motion data relates to brushing, rather than any other form of motion. This determination is made by comparing the value of the brushing dynamics 36 with maximum and minimum acceleration thresholds. If the value of the brushing dynamics 36 falls below the minimum acceleration threshold, the coaching device 4 determines that the device 4 is not moving and so the clustering process is not performed. If the value of the brushing dynamics 36 exceeds the maximum acceleration threshold, the coaching device 4 determines that the motion is not valid and so the clustering process is not performed.

After the pre-filtering, the filtered acceleration data, including the average gravitational acceleration 38 and the dynamics estimation 36 are passed on to a clustering module 15, which performs a clustering algorithm. The clustering algorithm produces the clustering results which comprise a plurality of clusters. The assignment of subsequent acceleration data to a particular cluster can be used to indicate which area of the mouth the user is brushing at any given time.

In the clustering module, the filtered average gravitational acceleration data related to brushing motion are first projected onto the Cartesian reference system (data in the z direction is dropped) and then converted into a vector in the polar coordinate system. To do this, the angular coordinate of a vector is calculated from the x and y components of the average gravitational acceleration 38. The radial component of the vector is the value of the dynamics estimation 36. Thus, in the polar coordinate system, the angle of a vector is determined by the gravitational acceleration data, while the radial component of the vector is determined by the dynamics estimation. This results in a vector in which both the gravitational component (related to the orientation of the toothbrush) and the linear acceleration component (related to the motion of the toothbrush) are taken into account. The clustering algorithm is then run on the data points in the polar coordinate system.

Alternatively, the filtered acceleration data may be projected into a spherical coordinate system. To do this, the angular coordinates of a vector are calculated from the x, y and z components of the average gravitational acceleration 38. In other words, the polar and azimuthal angles of the vector in the projected 3D space are the same as the corresponding angles of the three-dimensional vector formed from the gravitational acceleration data in the x, y, and z directions. The radial component of the vector in the projected 3D space is the value of the dynamics estimation 36. Thus, in the projected 3D space, the angles of a vector are determined by the gravitational acceleration data, while the radial component of the vector is determined by the dynamics estimation. This results in a modified three-dimensional space in which both the gravitational component (related to the orientation of the toothbrush) and the linear acceleration component (related to the motion of the toothbrush) are taken into account. The clustering algorithm is then run on the data points in the modified three-dimensional space.

The clustering algorithm organises similar data points into clusters. Each cluster therefore comprises data points that are similar to each other in some way and are dissimilar to data points belonging to other clusters. In this case, the clustering algorithm uses distance based clustering. This means that two or more data points are determined to be similar if they are close together in distance. The clustering algorithm uses cosine distance for measuring the cluster similarity instead of Euclidean distance. The clustering algorithm may also include a hysteresis, that favors the cluster from previous sample, by decreasing its distance slightly.

The purpose of the clustering algorithm is to classify the data or assign labels to data points. The first step is to come up with the labels, or clusters based on some training data, i.e. to create a model.

The model then provides parameters, to be used on live data, to transform the raw data into a more useful coordinate system. Then the similarity (or distance) of the data point to a central point of each cluster is calculated and the closest cluster is chosen as the label. There are many possible measures of distance, one of which could be Euclidian distance, that measures the 'length' between two tips of a vector. In the present embodiment, cosine distance, which measures the angle between two vectors, is used to determine similarity. However, this may be combined with other measures, such as Euclidian distance, or other distance measures may be used instead. The distance of a data point to each of the (four) clusters is calculated, and the cluster with smallest distance is chosen as the label (area of the mouth).

Each cluster is representative of a particular region of the mouth. Thus, the clusters represent a convenient way of mapping the acceleration data (including both the gravitational components and the linear acceleration components) onto a representation of the user's mouth.

For the feedback function to work, the clusters used in the clustering process need to be defined and associated with a particular region of the user's mouth. This is done by initially pre-loading the coaching device 4 with standard acceleration data from laboratory tests. A list of regions of the mouth for which the device should be providing feedback is then identified. The coaching device 4 is then placed in a particular region of the mouth and the clusters are defined by seeing which area of the mouth the pre-loaded acceleration data corresponds to.

When the user uses the coaching device 4 they brush their teeth and generate their own acceleration data. The acceleration data are filtered and mapped into the modified n-dimensional space in the same way as described above. The user's acceleration data are then compared to the pre-defined clusters to see which area of the mouth the user's acceleration data corresponds to. The result of the comparison is the area of the mouth that the coaching device 4 has determined the user is brushing.

By including both the gravitational component and the linear acceleration component in the clustering and comparison processes, the coaching device is able to take into account both the orientation of the toothbrush, and the brushing motion. Since for a typical user the brushing motion may vary between different areas of the mouth, this can allow a more accurate determination of the area of the mouth which is being brushed than if gravitational acceleration data alone were used.

The user's acceleration data from a particular brushing session is combined with the pre-stored acceleration data already stored on the coaching device 4. As the user uses the device they will generate more acceleration data which is combined with the pre-stored data. Once there is sufficient user specific acceleration data present, the clustering algorithm is run on the user specific data to generate user specific clustering results, instead of relying on the pre-defined clusters. Therefore, over time, the user's acceleration data replaces the pre-stored acceleration data and the user's clustering results replace the pre-determined clustering results. The clustering results generated using the user specific acceleration data provide a more accurate mapping between the acceleration data and the user's mouth. This allows more accurate feedback to be provided to the user.

Over time, clustering parameters used in the clustering and coaching process are updated and made more specific to an individual user. This happens when the coaching device 4 is online to an external device. The Bluetooth module 12 uses a Bluetooth connection to transfer the clustering data, via the transceiver 15, to the external device. The main parameter to be updated will be the cluster thresholds which are used to determine which cluster the acceleration data belongs to and consequently which region of the user's mouth is being brushed. As discussed, as the user uses the coaching function more, the coaching device 4 will collect and store more data corresponding to more brushing sessions. This data can be sent to the external device which analyses the historical data and updates the clustering thresholds if it is found that they are too lenient for a particular user.

This happens, for example, if a user is very consistent with their brushing technique and has well defined brushing motions for each area of the mouth. In this case, the difference between the user's maximum and minimum motions for each region of the mouth is small. This means that a user's brushing data forms small, well-defined clusters whose data points are close together. In order to effectively coach and instruct this type of user, the distance threshold used by the clustering algorithm and coaching function for each cluster needs to be smaller. That is, points are only considered as part of the same cluster if they are closely grouped together. The limit at which data points are not considered part of the same cluster has been reduced.

On the other hand, a user with a more erratic style of brushing has a greater difference between their maximum and minimum brushing motions for each region of the mouth. This means that a user's brushing data forms large clusters with fuzzy edges, i.e. the limit of each cluster is not well defined. The data points in each cluster are spread out. This means that the distance threshold used by the clustering algorithm and coaching function for each cluster needs to be larger to take into account the variation in data points. The limit at which data points are not considered part of the same cluster is much larger and so the boundaries of neighbouring clusters may be quite close together.

The clustering thresholds therefore take into account different brushing styles so that personalised coaching and feedback is provided. By updating the clustering thresholds, the coaching device 4 is able to provide tailored coaching to each individual user.

Figure 7:
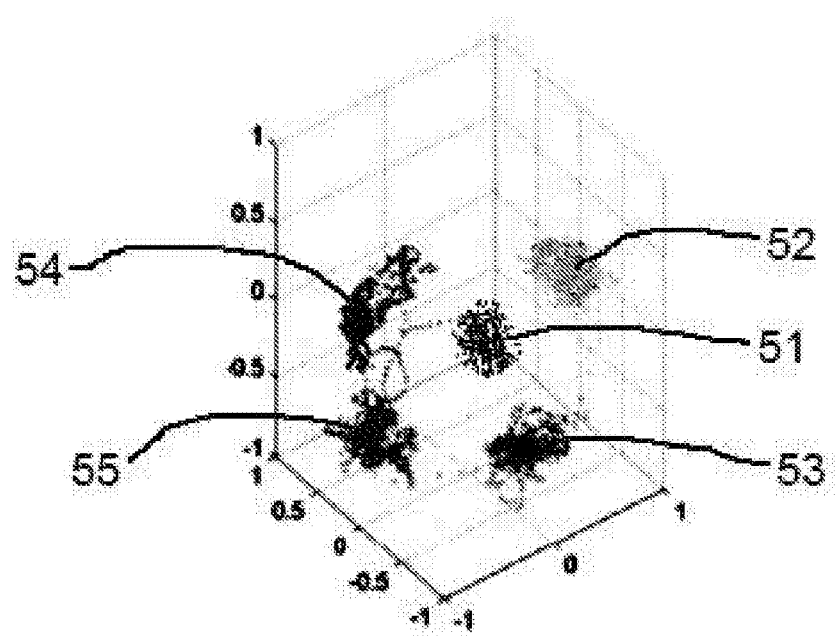
FIG. 7 is a plot of clustering results in one embodiment.

In one embodiment, the acceleration data are classified into five clusters in three-dimensional space, as shown in FIG. 7. The five clusters include a central cluster 51 which indicates that there is no brushing activity. As discussed above, it may be possible to remove this cluster in advance. The four other clusters 52, 53, 54, 55 are positioned around the central cluster 51. The four clusters 52, 53, 54, 55 represent the four main areas of the mouth that will be brushed by the user. These four areas are inner top, inner bottom, outer left, and outer right.

Figure 8:
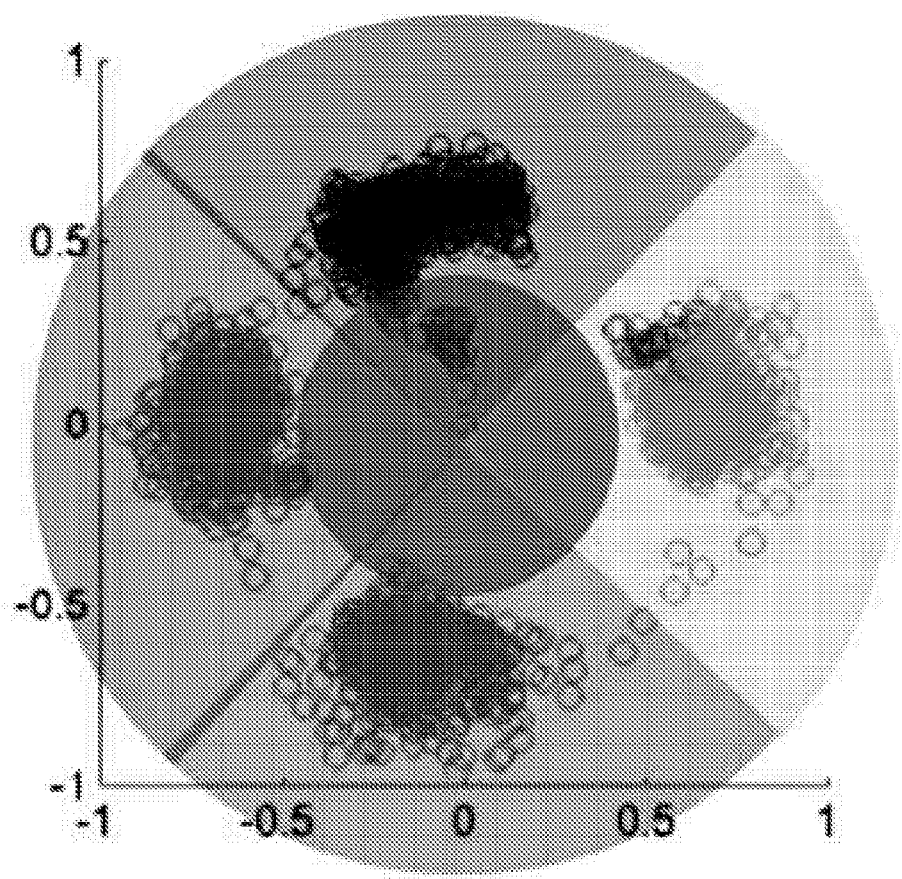
FIG. 8 is a plot of clustering results in another embodiment.

In another embodiment, the acceleration data are classified into four clusters in two-dimensional space, as shown in FIG. 8. The four clusters represent the four main areas of the mouth that will be brushed by the user. These four areas are inner top, inner bottom, outer left, and outer right.

The comparison process uses dynamic clustering to indicate the region of the mouth that is being brushed. This means that the comparison process uses the current acceleration data, as well as the previous result of the comparison process to determine which area of the mouth the user is brushing. The device is therefore able to predict which area of the mouth is being brushed when it receives data which are equidistant from two clusters. This works because, typically, a user will brush adjacent areas of the mouth when brushing their teeth rather than move around the mouth in a disjointed, random manner. For example, if current acceleration data is equidistant between two clusters, each cluster representing the outer right region and inner top region, but the previous comparison result indicated that the user was brushing the outer left region of the mouth, it is highly likely that the current data corresponds to brushing the outer right region of the mouth. This is because a user is more likely to have moved from the outer left part of the mouth to the outer right part of the mouth than to have moved from the outer left to the inner top.

In practice, this may be achieved by giving the previous cluster a slight 'bonus' or preference by decreasing its cosine distance (or other distance measure) by a predetermined amount (for example 0.4). Therefore, the data point has to be closer to the 'main mass' of another cluster for the cluster to change.

In order to help the user improve their brushing technique, real time feedback is provided so that the user can make appropriate adjustments to their brushing technique. Feedback is provided for a variety of activities.

Feedback is provided based on how long the user has been brushing their teeth. Feedback is provided based on the duration of the total brushing session and the duration of brushing each region of the user's mouth. While brushing is taking place, the accelerometer provides an interrupt to the processor so that the accelerometer can provide the processor with a new sample of acceleration data. The interrupt is provided every 50 ms; however any other suitable interrupt time also be used. The total duration of brushing activity is determined based on the number of interrupts received by the processor. The processor can calculate how many periods of 50 ms have passed based on the number of interrupts, or the number of sample sets, it has received. Similarly, the amount of time spent brushing each region of the user's mouth is determined based on the number of samples received corresponding to each region of the user's mouth.

Feedback can then be provided to the user by comparing, using the processing module 9, the duration during of the actual brushing session with an ideal duration of brushing session. For example, if the user has been brushing their mouth for a total length of time that is less than the total time recommended by professionals then the coaching device 4 indicates to the user that they need to brush for longer until they have reached the desired time limit. Currently it is recommended that a user brushes their teeth for a total duration of two minutes. However, as will be appreciated, any other suitable total brushing time may also be used.

If the user brushes their teeth for less than the recommended total time then they risk not cleaning their teeth properly. In this case, the coaching device 4 instructs the user to brush for longer.

If the user continues to brush their teeth after the recommended total time has expired they risk damaging their teeth by eroding away the sensitive outer layer. In this case, the coaching device 4 instructs the user to stop brushing their teeth.

Whilst brushing the teeth for the total recommended time is beneficial, the user must ensure that they are brushing all areas of their mouth during this time, rather than focusing on one particular area. It is therefore recommended that equal amounts of time are spent brushing each of the four areas of the mouth identified by the toothbrush device. The recommended time spent brushing each area of the mouth is 30 seconds, although any other suitable time period could also be used.

The coaching device 4 therefore instructs the user if they have spent too long or not enough time brushing one area of the mouth. The user is instructed to either move on to a different area of the mouth or to return to a previously brushed area. The coaching device 4 therefore ensures that all areas of the mouth have received proper attention.

In order to avoid potentially causing harm to the inside of the mouth, it is important that the user does not brush their teeth too hard or too vigorously. If the coaching device 4 determines that the user is brushing their teeth too vigorously, the coaching device 4 instructs the user to brush more carefully. For example, when the coaching device 4 determines that the change in acceleration exceeds a certain threshold, indicating that the user is brushing too fast, the coaching device 4 will subsequently instruct the user to slow down. When the coaching device 4 determines that the speed of the toothbrush per unit time has exceeded a maximum speed threshold and that this threshold has been exceed for a certain period of time, this indicates that the user is brushing their teeth too fast. The coaching device 4 therefore instructs the user to brush more slowly until the speed drops below the upper threshold.

Feedback to the user is provided using a variety of feedback means. Feedback is provided through the use of a plurality of LEDs 40 positioned on the toothbrush coaching system 2. The LEDs 40 are positioned on an external surface of the coaching device 4, although any other suitable location can be used which would allow the user to see the LEDs clearly. The LEDs 40 can be white, green, red, or any other colour or combination of colours. The colour of the LED 40 at any given time is used to instruct the user on how they should be brushing their teeth.

FIG. 9 illustrates some example instructions which are programmed into the toothbrush coaching system 2. For example, if a user has been brushing one area of their mouth for longer than the recommended period of time, for example greater than 30 seconds, the LED 40 blinks green light to instruct the user to switch to a different area of the mouth.

If the user is brushing too fast, the LED 40 blinks red to instruct the user to slow down.

If the user has been brushing for a total brushing time which exceeds the recommended total brushing time, for example greater than 2 minutes, the LED 40 is a solid red light. This instructs the user to stop brushing their teeth.

After the brushing session is complete the coaching device 4 stores a summary of the brushing session locally on the device 4. The brushing data of the brushing session is stored on the internal memory 16 in the coaching device 4. As well as storing the actual data, the coaching device 4 also stores the time at which the brushing activity of a particular session was started and completed. The timings of the brushing sessions are then used to indicate to the user the total amount of time that the brushing session lasted.

The coaching device 4 also stores a complete history of the brushing region per second that was performed by the user during the brushing session. That is, the coaching device 4 stores a complete history of what part of the mouth was brushed and when, from the time the brushing session started until the time the brushing session was completed. This data is used to provide an indication to the user the brushing pattern of their brushing session.

The coaching device 4 also stores a complete history of the speed of the brushing motion at each second for a particular brushing session. That is, the coaching device 4 stores a complete history of how fast the user was brushing their teeth each second, from the time the brushing session started until the time the brushing session was completed. This data can then be presented to the user so that the user is able to view how their brushing speed changed over the course of the brushing session. The user is also able to see how their brushing speed changed depending on which area of the mouth was being brushed.

When the toothbrush system 2 is online, the coaching device 4 syncs the brushing summary stored on the internal memory 16 with the external device. The external device therefore has a complete, up to date record of all the brushing sessions which have taken place. The user can then use the external device to view past brushing sessions and compare the data.

Use of the coaching device and the coaching function, including recordal, analysis, and corresponding feedback of brushing data, requires a lot of power. This has the risk that battery life may be poor, if the battery is not properly conserved.

To help improve battery life the battery charging circuit is decoupled from the rest of the coaching system. This allows only the battery to be charged when the power is low rather than feeding power into the entire system. This is because only the battery charging circuit is powered up, and not the whole system. This leads to quicker battery charging times and a smaller portion of the total circuitry is being used during charging. Once the battery is fully charged, the entire coaching system will be powered up and turned on. Alternatively, the entire system may power on once the charging level of the battery has exceed an upper threshold.

When the battery is being drained, and the level of charge drops below a lower threshold, the coaching system shuts itself down. The use of a minimum threshold below which the coaching system will not work helps reduce the risk of completely depleting the battery of charge. Preventing complete depletion helps with battery life (longevity), i.e. it will last for more charging cycles or keep more charge as it ages. The earlier shut down allows the device to keep some power for the internal clock to keep running so that the offline sessions can be correctly timestamped. The data is safe in the flash (persistent memory), even without power.

As will be appreciated, the toothbrush coaching system 2 may be used in environments that leave electronic devices at risk of water damage. Charging ports on the coaching device 4, for example a micro-USB charging port, provide a way for water to enter the internal circuitry of the coaching device 4.

To minimise the risk of water entering the coaching device 4 and damaging the circuitry, the end cap 60 is provided with a flexible flap 64, as shown in FIG. 10c. The flap 64 comprises an internal 66 and an external 68 surface. The external surface 68 is configured to be a smooth surface so that it does not interfere with other components present on the coaching device 4.

The internal surface of the protective flap is inserted into the charging port 62, as shown in FIGS. 10*a* and 10*b*, to prevent the ingress of water. The internal surface 66 therefore has a protrusion 70 on it. The protrusion 70 on the internal surface of the flap 64 is configured to correspond to the internal shape of the charging port 62. When the flap protrusion 70 is inserted into the charging port 62, the structure of the protrusion 70 fits snuggly within the port 62 so that a water-tight seal is formed. The snug fit also ensures that the protrusion 70 does not slip out of the charging port 62.

The protective flap 64 is made from a flexible plastic. It will be appreciated that any other suitable material may be used that is both flexible and waterproof.

Whilst the embodiment described herein has been described using a detachable housing and end cap comprising the PCB, in other embodiments the housing, end cap, and therefore the PCB, may be permanently attached to the toothbrush.

Although the coaching function has been described as operating in the offline mode, in some embodiments when coaching device is online and connected to an external device, the coaching function operates in online mode and provides feedback, or coaching, to a user whilst connected to an external device.

In some embodiments, instead of simply picking up and putting down the device 4 to turn it on and off, the user firmly shakes the toothbrush coaching system 2. The shaking motion of the toothbrush system 2 is detected by the processing module 9, which is running in the background while the device 2 is in sleep mode. The processing module 9 recognises that this motion is not related to brushing motion and so the processing module 9 powers up the entire coaching device 4. The user can then begin to use the toothbrush system 2 to brush their teeth. Similarly, the user can turn off the device 4, or cause it to enter sleep mode, by firmly shaking the device 4 when they are finished with it. The processing module 9 recognises that this motion is, again, not related to brushing motion and so it will switch off any modules that are no longer needed.

In some embodiments, many other feedback instructions will be programmed into the toothbrush coaching system with corresponding LED signals. The instructions and corresponding signals illustrated in FIG. 9 are exemplary only and different signals for the same instructions, different or additional instructions, or different or additional signals may be used.

As well as visual feedback, some embodiments of the toothbrush coaching system provide audio feedback. In this case, the toothbrush coaching system is provided with a speaker to communicate the feedback instructions to the user. The speaker is positioned in the coaching device 4, although any other suitable location which allows the user to sufficiently hear the audio instructions could also be used. The audio feedback can be in addition to or instead of the visual feedback. Examples of audio feedback include instructions such as "slow down", "change areas", and "stop".

In some embodiments, vibration feedback is also provided. This is provided in addition to or instead of the audio and/or visual feedback. In some embodiments, any combination of vibration, audio, and visual feedback is used to provide coaching instructions to the user. In the case of vibration feedback, the toothbrush coaching system is provided with a vibration device. The vibration device be positioned in the coaching device 4, although any other suitable positioned which allows the user to feel the vibrations may be used. Examples of vibration feedback include long or short pulses of vibrations and combinations thereof.

In some embodiments, other data related to brushing parameters is stored in the brushing summary. In some embodiments, the coaching device 4 records and stores an overall score associated with the particular brushing session. The overall score is based on the user's compliance with the real-time instructions received from the feedback device. A high level of compliance, representing a good brushing session, corresponds to a high overall score. A low level of compliance, representing a poor brushing session, corresponds to a low overall score. The user is able to see, at a glance, how their brushing technique changes between different brushing sessions. This allows the user to easily identify whether their brushing technique is improving over time or not.

In some embodiments, the external device analyses the data from consecutive and historical brushing session once the data has been synced with the external device. The user is then presented with various graphs and information indicating how their brushing technique has changed with time. The coaching device 4 can also remove or delete data that has been synced with the external device from its internal memory, to help free up space allowing more brushing sessions to be recorded.

In some embodiments, other parameters which are updated when the device is online including the cut-off frequencies used in either one or more than one of the low-pass filters. The particular feedback response used to instruct a user can also be updated. For example, the colour of the light used in response to a particular activity can be updated.

In some embodiments, the rechargeable battery, charging circuitry and PCB may be integrated into the housing with the other components. Thus, there is no need for an end cap to contain the electronics. In this case, the protective flap is present on a surface of the housing to prevent water from entering the coaching device 4.

It will be appreciated that embodiments of the present invention have been described by way of example only, and modifications in detail will be apparent to the skilled person. For example, features of one embodiment may be used with any other embodiment. Furthermore, the invention is not limited to these embodiments, and variations in detail may be made within the scope of the appended claims.

The invention claimed is:

1. A device configured to provide an indication of brushing activity of a toothbrush, the device comprising:
   an accelerometer configured to produce acceleration data from motion of the toothbrush, wherein the accelerometer is configured to produce the acceleration data in three orthogonal directions; and
   a processor configured to:
      receive the acceleration data;
      extract gravitational components in three orthogonal directions from the acceleration data by low pass filtering the acceleration data to produce the gravitational components, wherein the gravitational components provide an indication of how the toothbrush is orientated;
      calculate at least one angular coordinate from the gravitational components;
      extract linear acceleration components in three orthogonal directions from the acceleration data by high pass filtering the acceleration data to produce the linear acceleration components;

average a magnitude of the linear acceleration components in the three orthogonal directions to produce an estimate of brushing dynamics, wherein the estimate of brushing dynamics is a scalar value that provides an indication of at least one of how strongly or how quickly a user is brushing teeth of the user;

project the gravitational components and the estimate of brushing dynamics into an n-dimensional space, where n≥2, wherein an angular coordinate of an n-dimensional vector in the n-dimensional space is the at least one angular coordinate calculated from the gravitational components of the acceleration data, and a radial coordinate of the n-dimensional vector in the n-dimensional space is the estimate of brushing dynamics;

perform a clustering process on a plurality of n-dimensional vectors formed by projecting subsequent gravitational components and estimates of brushing dynamics into the n-dimensional space to produce clustering results, the clustering results comprising a plurality of clusters each of which represents one brushing area; and determine a brushing area based on an assignment of subsequent gravitational components and estimates of brushing dynamics projected into the n-dimensional space to a particular cluster; and a feedback module configured to provide feedback to the user based on the determination of brushing area, thereby providing an indication of brushing activity.

2. The device according to claim 1, wherein the clustering process uses cosine distance to determine which cluster the acceleration data belongs to.

3. The device according to claim 2, wherein parameters of the clustering process are updated based on historical user clustering results.

4. The device according to claim 1, wherein regions associated with a particular cluster are pre-stored on the device.

5. The device according to claim 1, wherein regions associated with a particular cluster are updated based on historical user clustering results.

6. The device according to claim 1, wherein the clustering results comprise at least four clusters.

7. The device according to claim 6, wherein the at least four clusters represent at least the following brushing areas of the mouth: inner top, inner bottom, outer left, and outer right.

8. The device according to claim 1, wherein an immediately preceding clustering result is used to determine an immediately following clustering result.

9. The device according to claim 1, wherein the device is configured to determine whether the acceleration data correspond to motion related to brushing before the clustering process is performed, wherein the acceleration data is determined to correspond to motion related to brushing when the acceleration data exceed a motion threshold.

10. The device according to claim 1, wherein the feedback module is configured to provide feedback to the user in real time as the user is brushing their teeth.

11. The device according to claim 1, wherein the feedback module comprises at least one of: a visual feedback device; an audio feedback device; or a vibration device.

12. The device according to claim 1, wherein the feedback module is configured to alert the user when the user is brushing at a speed that is greater than a maximum speed.

13. The device according to claim 1, wherein the feedback module is configured to alert the user when the user has been brushing for a time that is greater than a maximum time for a particular area of the mouth.

14. The device according to claim 1, wherein the feedback module is configured to alert the user when the user has been brushing for a time that is less than a minimum time for a particular area of the mouth.

15. The device according to claim 1 wherein the feedback module is configured to alert the user when the user has been brushing for a total brushing time that is greater than a maximum total time for the whole brushing session.

16. The device according to claim 1, wherein the feedback module is configured to provide an indication of the area of the mouth being brushed.

17. The device according to claim 1, wherein the n-dimensional space is two-dimensional space and the processor is configured to:

calculate at least one angular coordinate from the gravitational components by calculating an angular coordinate from a magnitude of two of the gravitational components;

project the gravitational components and the estimate of brushing dynamics into the two-dimensional space, wherein an angular coordinate of a two-dimensional vector in the two-dimensional space is the angular coordinate calculated from the magnitude of two of the gravitational components of the acceleration data, and a radial coordinate of the two-dimensional vector in the two-dimensional space is the estimate of brushing dynamics;

perform the clustering process on a plurality of two-dimensional vectors formed by projecting subsequent gravitational components and estimates of brushing dynamics into the two-dimensional space to produce clustering results, the clustering results comprising the plurality of clusters each of which represents one brushing area; and determine the brushing area based on the assignment of subsequent gravitational components and the estimates of brushing dynamics projected into the two-dimensional space to the particular cluster.

18. The device according to claim 1, further comprising a communication module configured to communicate at least one of the clustering results or the determination of the brushing area to an external device.

19. A method of providing an indication of brushing activity with a toothbrush, the method comprising the steps of:

using an accelerometer to produce acceleration data from motion of the toothbrush, wherein the accelerometer produces the acceleration data in three orthogonal directions;

extracting gravitational components in three orthogonal directions from the acceleration data by filtering the acceleration data to produce the gravitational components, wherein the gravitational components provide an indication of how the toothbrush is orientated;

calculating at least one angular coordinate from the gravitational components;

extracting linear acceleration components in three orthogonal directions from the acceleration data by filtering the acceleration data to produce the linear acceleration components;

averaging a magnitude of the linear acceleration components in the three orthogonal directions to produce an estimate of brushing dynamics, wherein the estimate of brushing dynamics is a scalar value that provides an indication of at least one of how strongly or how quickly a user is brushing teeth of the user;

projecting the gravitational components and the estimate of brushing dynamics into an n-dimensional space, where n≥2, wherein an angular coordinate of an n-dimensional vector in the n-dimensional space is the at least one angular coordinate calculated from the gravitational components of the acceleration data, and a radial coordinate of the n-dimensional vector in the n-dimensional space is the estimate of brushing dynamics;

performing a clustering process on a plurality of n-dimensional vectors formed by projecting subsequent gravitational components and estimates of brushing dynamics into the n-dimensional space to produce clustering results, the clustering results comprising a plurality of clusters each of which represents one brushing area;

determining a brushing area based on an assignment of subsequent gravitational components and estimates of brushing dynamics projected into the n-dimensional space to a particular cluster; and providing feedback to the user based on the determination of the brushing area, thereby providing an indication of brushing activity.

20. A device configured to provide an indication of brushing activity of a toothbrush, the device comprising:

an accelerometer configured to produce acceleration data from motion of the toothbrush, wherein the accelerometer is configured to produce the acceleration data in three orthogonal directions; and a processor configured to:
receive the acceleration data;
extract gravitational components in three orthogonal directions from the acceleration data by low pass filtering the acceleration data to produce the gravitational components, wherein the gravitational components provide an indication of how the toothbrush is orientated;
calculate at least one angular coordinate from the gravitational components;
extract linear acceleration components in three orthogonal directions from the acceleration data by high pass filtering the acceleration data to produce the linear acceleration components;
average a magnitude of the linear acceleration components in the three orthogonal directions to produce an estimate of brushing dynamics, wherein the estimate of brushing dynamics is a scalar value that provides an indication of at least one of how strongly or how quickly a user is brushing teeth of the user;
project the gravitational components and the estimate of brushing dynamics into an n-dimensional space, where n≥2, wherein an angular coordinate of an n-dimensional vector in the n-dimensional space is the at least one angular coordinate calculated from the gravitational components of the acceleration data, and a radial coordinate of the n-dimensional vector in the n-dimensional space is the estimate of brushing dynamics;
perform a clustering process on a plurality of n-dimensional vectors formed by projecting subsequent gravitational components and estimates of brushing dynamics into the n-dimensional space to produce clustering results, the clustering results comprising a plurality of clusters each of which represents one brushing area; and
determine a brushing area based on an assignment of subsequent gravitational components and estimates of brushing dynamics projected into the n-dimensional space to a particular cluster; and a feedback module configured to provide feedback to the user based on the determination of brushing area, thereby providing an indication of brushing activity, wherein the clustering process uses cosine distance to determine the cluster to which the n-dimensional vector belongs, and wherein the clustering process favors the cluster to which an immediately preceding n-dimensional vector was assigned by decreasing its cosine distance by a predetermined amount.

* * * * *